US009430696B2

United States Patent
Wilder et al.

(10) Patent No.: US 9,430,696 B2
(45) Date of Patent: Aug. 30, 2016

(54) CONTINUOUS ENROLLMENT FOR FACE VERIFICATION

(71) Applicant: SENSORY, INCORPORATED, Santa Clara, CA (US)

(72) Inventors: Matthew Wilder, Boulder, CO (US); Bryan Pellom, Erie, CO (US)

(73) Assignee: Sensory, Incorporated, Santa Clara, CA (US)

( * ) Notice: Subject to any disclaimer, the term of this patent is extended or adjusted under 35 U.S.C. 154(b) by 55 days.

(21) Appl. No.: 14/510,995

(22) Filed: Oct. 9, 2014

(65) Prior Publication Data

US 2016/0104034 A1    Apr. 14, 2016

(51) Int. Cl.
*G06K 9/00* (2006.01)
*H04N 5/232* (2006.01)

(52) U.S. Cl.
CPC ...... *G06K 9/00288* (2013.01); *H04N 5/23229* (2013.01)

(58) Field of Classification Search
CPC .. G06F 21/31; G06F 17/30598; G06F 21/00; G06F 3/1292; G06F 21/32; G06F 17/30554; G06F 17/30424; G06K 9/00221; G06K 9/00288; G06K 9/00268; G06K 9/00302; G06K 9/00711
USPC ........................................................ 382/118
See application file for complete search history.

(56) References Cited

U.S. PATENT DOCUMENTS

| | | | | |
|---|---|---|---|---|
| 2002/0136433 A1* | 9/2002 | Lin | ..................... | G06K 9/00295 382/118 |
| 2004/0004633 A1* | 1/2004 | Perry | .................. | G06Q 30/0603 715/728 |
| 2007/0046696 A1* | 3/2007 | Zheng | .................. | G06K 9/6206 345/646 |
| 2010/0067750 A1* | 3/2010 | Matsuo | ............. | G06F 17/30265 382/118 |
| 2011/0183711 A1* | 7/2011 | Melzer | ............... | H04N 5/23219 455/556.1 |
| 2011/0257971 A1* | 10/2011 | Morrison | ........... | G06K 9/00221 704/233 |
| 2012/0013737 A1* | 1/2012 | Umeyama | .......... | H04N 5/23254 348/135 |
| 2013/0027571 A1* | 1/2013 | Parulski | ................. | H04N 5/232 348/207.11 |
| 2013/0148898 A1* | 6/2013 | Mitura | ..................... | G06K 9/62 382/195 |
| 2013/0188840 A1* | 7/2013 | Ma | ..................... | G06K 9/00221 382/107 |
| 2013/0222644 A1* | 8/2013 | Son | ..................... | H04N 5/23219 348/239 |
| 2014/0289834 A1* | 9/2014 | Lindemann | ............ | G06Q 20/42 726/7 |
| 2014/0337930 A1* | 11/2014 | Hoyos | ..................... | H04L 63/10 726/4 |
| 2015/0124277 A1* | 5/2015 | Ono | ....................... | G06F 3/1222 358/1.14 |
| 2015/0261787 A1* | 9/2015 | Hu | .................... | G06F 17/30247 382/118 |

* cited by examiner

*Primary Examiner* — Stephen R Koziol
*Assistant Examiner* — Shaghayegh Azima
(74) *Attorney, Agent, or Firm* — Fountainhead Law Group P.C.

(57) ABSTRACT

Techniques for performing continuous enrollment for face verification are provided. In one embodiment, a computing device can receive, from a user, an indication that the user wishes to authenticate himself/herself with the computing device via face verification. In response to the indication, the computing device can capture, using a camera, a series of images of the user's face and can authenticate the user by evaluating each of the series of images against a face template for the user, where the user is authenticated based on an N-th image in the series. Once the user has been authenticated, the computing device can select one or more images from the series prior to the N-th image and can add the selected images to the user's face template.

33 Claims, 5 Drawing Sheets

CONTINUOUS ENROLLMENT FOR FACE VERIFICATION

BACKGROUND

With the proliferation of cameras in computing devices such as smartphones, tablets, laptop computers, and the like, it has become increasingly common for such devices to implement face verification systems (also known as face recognition systems) for user authentication. In a conventional face verification system, a device user is typically required to complete an initial enrollment process in which the user is instructed to look squarely at the device's camera, thereby allowing the camera to capture one or more frontal view images of the user's face. The face verification system uses these frontal view image(s) to generate a face template for the user. The face verification system can then compare the face template to images of the user's face that are captured at the point of authentication in order to verify the user's identity.

One problem with the conventional approach above is that, since the enrolled face template relies solely on frontal view images of the user's face, the user must generally look at the device's camera straight-on (i.e., using the same frontal pose used during the enrollment process) at the time he/she wishes to be authenticated. If the user positions his/her face in a manner that is not square with the camera (referred to herein as an "off-pose" position), the authentication is more likely to fail, or at least be delayed until the user turns his/her face into a square position, because the face template does not have any data representing the sides of the user's face. A workaround for this problem is to capture multiple facial poses from the user during the enrollment process by, e.g., instructing the user to look left, right, up, and/or down (in addition to straight-on). However, this workaround makes the enrollment process cumbersome and unnatural for the user. In addition, the captured facial poses may still not reflect the actual poses that the user will present when attempting to authenticate himself/herself, and thus may not result in more accurate or more rapid authentication outcomes.

SUMMARY

Techniques for performing continuous enrollment for face verification are provided. In one embodiment, a computing device can receive, from a user, an indication that the user wishes to authenticate himself/herself with the computing device via face verification. In response to the indication, the computing device can capture, using a camera, a series of images of the user's face and can authenticate the user by evaluating each of the series of images against a face template for the user, where the user is authenticated based on an N-th image in the series. Once the user has been authenticated, the computing device can select one or more images from the series prior to the N-th image and can add the selected images to the user's face template.

A further understanding of the nature and advantages of the embodiments disclosed herein can be realized by reference to the remaining portions of the specification and the attached drawings.

DETAILED DESCRIPTION

Figure 1:
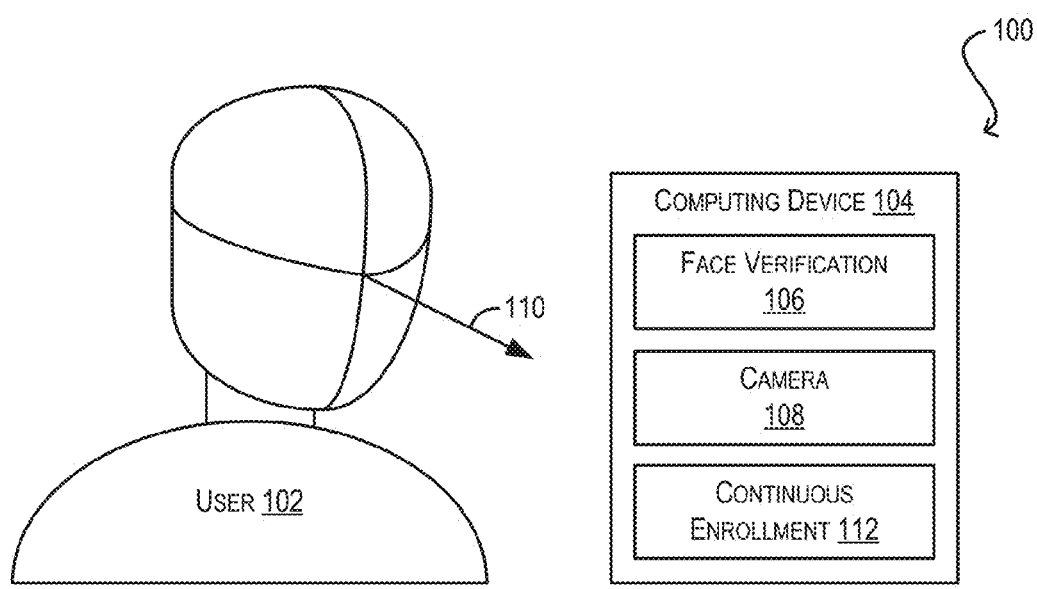
FIG. 1 depicts a system environment according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that can be implemented by a computing device for performing continuous enrollment of device users for face verification. These techniques are premised on the notion that, at the time of authentication, a user will typically turn or rotate his/her face from an off-pose position to a straight-on (i.e., square) position with respect to the device's camera in order to authenticate himself/herself. In one set of embodiments, while the user is turning his/her face, the computing device can capture and buffer a series of images of the user's face in these off-pose positions. At the moment the user is successfully authenticated (e.g., when the user has fully turned his/her face towards the device's camera), the computing device can look back in time at the previously captured/buffered images and can automatically add one or more of those images to the user's face template. In this way, the off-pose positions that the user presented while (or before) turning toward the camera can be incorporated into the face template. Then, the next time the user attempts to authenticate himself/herself via face verification in a similar setting, the computing device can authenticate the user without requiring the user to fully turn towards the camera (since the face template now has data for the user's off-pose position(s)).

With the approach above, there is no need for the user to provide explicit enrollment data for the off-pose positions; instead, the user can participate in a conventional enrollment process where he/she only looks squarely at the device camera, and the computing device can dynamically capture off-pose information at the time of authentication, without the user's knowledge or input. Thus, there is no additional burden on the user when compared to existing face verification approaches.

At the same time, this approach can significantly improve authentication time and accuracy, assuming that the off-pose positions presented by the user are similar for each authentication event. For example, consider a scenario where the user is sitting in a vehicle with the computing device placed in a fixed location (e.g., a car cup-holder). In this scenario, the relative positioning of the user and the computing device will remain the same each time the user wishes to authenticate himself/herself, and thus the off-pose positions presented by the user will generally be consistent. This, in turn, means that the user's face template (which is updated to include the user's off-pose information after a first authentication attempt) can be used to immediately authenticate the user on the second and subsequent authentication attempts, before the user turns to look at the device's camera. Note that this immediate authentication has the additional benefit of allowing the user to keep his/her gaze on the road if the user is the vehicle driver.

The foregoing and other aspects of the present invention are described in further detail in the sections that follow.

2. System Environment

FIG. 1 depicts a system environment 100 that supports continuous enrollment for face verification according to an embodiment. As shown, system environment 100 includes a user 102 and a computing device 104. Computing device 104 can be any type of electronic device that is capable of (either alone or in conjunction with other devices/systems) verifying user 102's identity based on his/her face. In one embodiment, computing device 104 can be a handheld device, such as a smartphone, a tablet, a smartwatch, or the like. In other embodiments, computing device 104 can be a larger device or system, such as a desktop computer, a kiosk or ATM machine, an in-vehicle computer system, etc. To carry out its face verification processing, computing device 104 can include a face verification module 106 and a camera 108.

As noted in the Background section, one drawback with existing face verification systems is that they generally rely on a static enrollment process in which a device user is instructed to look straight-on at the device's camera, thereby generating a face template that is based solely on a frontal view of the user's face. For instance, in the example of FIG. 1, user 102 would be instructed to look straight-on at camera 108 (shown by directional arrow 110). This means that, at the point of authentication, the user must present substantially the same frontal pose to the device in order to be successfully authenticated, since the face template does not have any data for off-pose positions of the user's face.

To address the foregoing and other similar issues, computing device 104 of FIG. 1 can include a novel continuous enrollment module 112. In various embodiments, continuous enrollment module 112 can be implemented as software that is executed by, e.g., a general-purpose processor of computing device 104, as a dedicated hardware component, or as a combination of software and hardware. As described in further detail below, computing device 104 can leverage module 112 to continuously learn off-pose positions that are presented by user 102 at the point of authentication, and can dynamically update user 102's face template based on those learned positions. This, in turn, can enable face verification module 106 to more accurately and quickly authenticate user 102 in situations where his/her facial pose may not be square with camera 108. For example, in certain embodiments, face verification module 106 can authenticate user 102 immediately upon initiating the authentication process, before the user has even had a chance to turn his/her face towards camera 108.

3. Workflows

Figure 2:
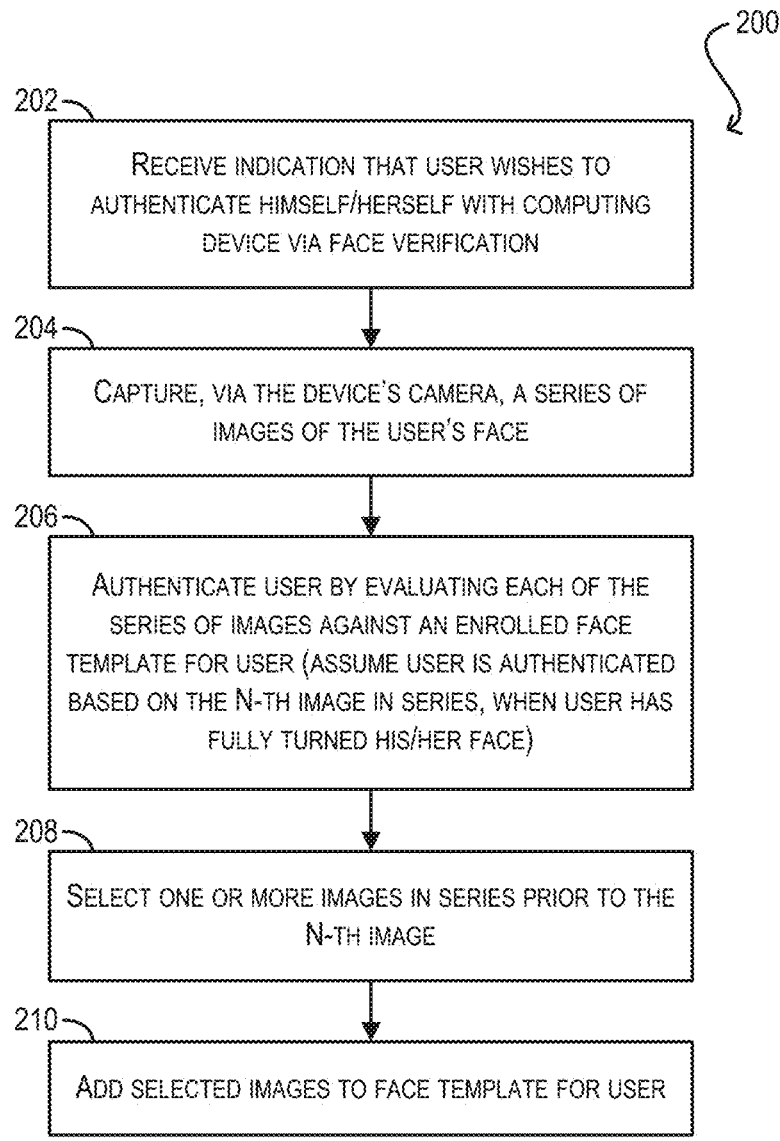
FIG. 2 depicts a first workflow for enabling continuous enrollment for face verification according to an embodiment.

FIG. 2 depicts an authentication workflow 200 that can be performed by computing device 104 with respect to user 102 for enabling continuous enrollment according to an embodiment. Workflow 200 assumes that computing device 104 has already created, via an initial enrollment process, a face template for user 102 that is solely based on a frontal view of user 102's face.

At block 202, computing device 104 can receive an indication that user 102 wishes to authentication himself or herself with the device via face verification. Computing device 104 can receive this indication in various different formats, such as a button press, a voice command, a hand motion/movement, etc.

Upon receiving the indication at block 202, computing device 104 can begin capturing, via camera 108, a series of images of user 102's face (block 204). In a particular embodiment, this can involve taking photos or a video of the field of view in front of camera 108 and applying a face detection algorithm to detect a face in the captured photos/or video. The photos or video frames with a detected face can be considered candidate images for consideration by face verification module 106 and can be buffered by computing device 104 in a temporary memory.

At block 206, face verification module 106 can evaluate each of the candidate images captured/buffered at block 204 against the enrolled face template for user 102 and can authenticate the user based on the N-th image in the series. As noted previously, it is assumed that the face template initially includes data for only a frontal view of user 102's face. Thus, the N-th image will generally be an image where user 102 has fully turned his/her face towards camera 108.

Finally, at blocks 208 and 210, continuous enrollment module 112 can select one or more images in the series prior to the N-th image and can add the selected image(s) to user 102's face template, thereby dynamically updating the template. The rationale behind these steps is that, before the Nth-image, user 102 was likely in the process of turning his/her face towards camera 108 in order to be authenticated. Thus, by adding one or more images prior to the N-th image to user 102's face template, continuous enrollment module 112 can automatically enhance the face template to detect these off-pose positions. Face verification module 106 can then use the enhanced face template during a subsequent authentication attempt to authenticate user 102 while user 102's face is still in an off-pose position (e.g., before he/she has turned to look at camera 108), thereby speeding up the authentication process.

It should be appreciated that the particular manner in which the prior images are selected at block 208 can vary. For example, in one embodiment, continuous enrollment module 112 can select the first image in the candidate series. In another embodiment, continuous enrollment module 112 can select all of the N-1 images in the series prior to the N-th image. In yet another embodiment, continuous enrollment module 112 can calculate a measure of similarity (e.g., distance similarity) between each of the series of images and the face template, and can select the images that are closest to the face template. One of ordinary skill in the art will recognize other variations, modifications, and alternatives for the selection processing at block 208.

Figure 3:
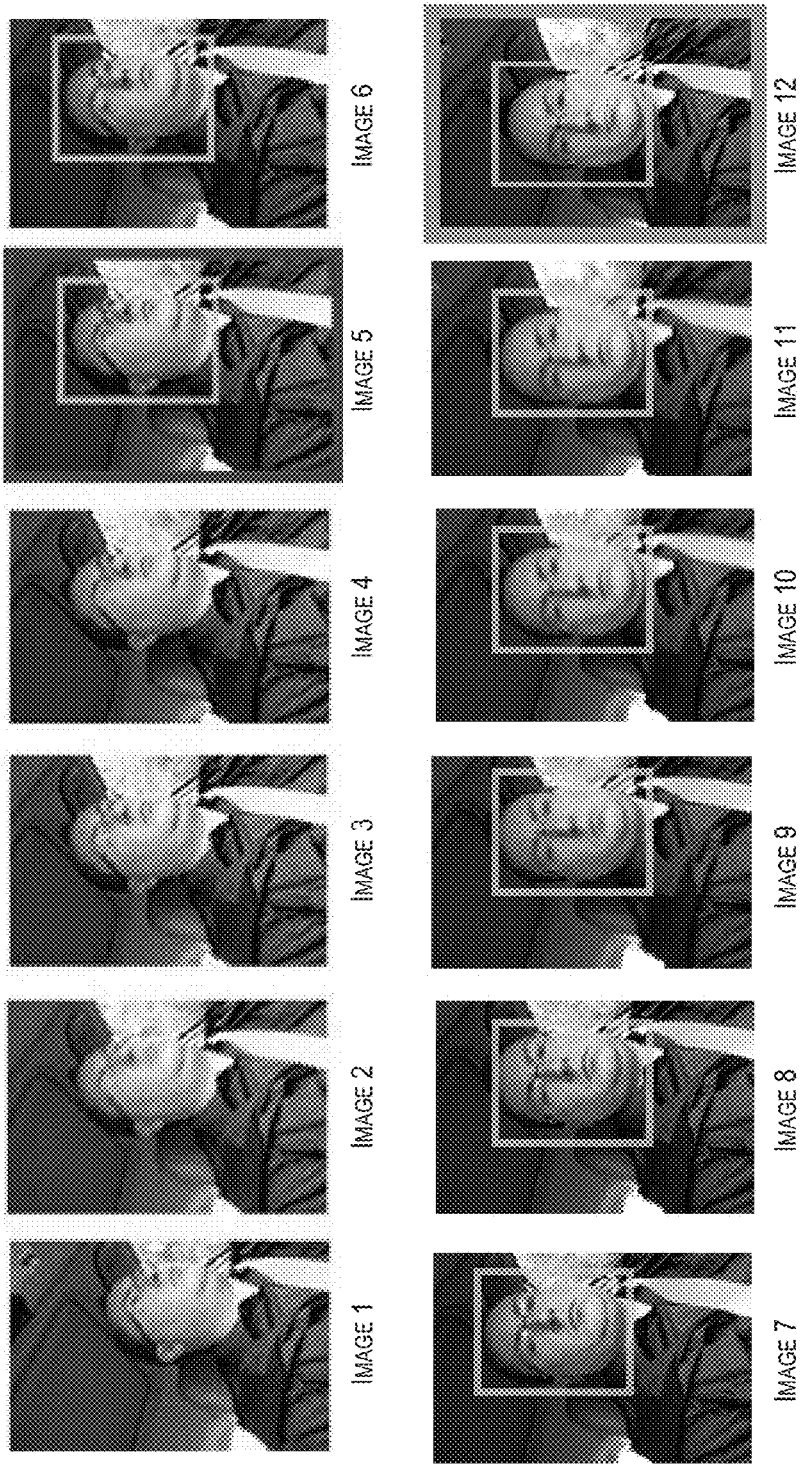
FIG. 3 depicts a series of images captured per the workflow of FIG. 2 according to an embodiment.

To clarify the operation of workflow 200, FIG. 3 depicts an exemplary series of images 300 that may be captured by computing device 104 per workflow 200 according to an embodiment. In the example of FIG. 3, the user is depicted within an in-vehicle environment, although the techniques of the present invention may also apply to other environments.

As shown, starting with image 1, computing device 104 begins capturing images in its field of view. Note that the user has not yet begun turning his face towards the camera. At image 5, device 104 detects a face within the image frame (shown by the yellow border). Thus, image 5 can be considered the first image in the series of candidate images to be evaluated by face verification module 106, and device 104 can begin buffering the images at this point.

At images 5 through 11, the user gradually turns his head towards camera 108 for authentication. At image 12, the user's face is square enough with camera 108 for face verification module 106 to authenticate the user based on the user's initial face template. This authentication moment is shown by the green border around image 12.

In response to the authentication performed with respect to image 12, continuous enrollment module 112 goes back though previously buffered images 5-11 and selects one or more of the buffered images for inclusion in the user's face template. In this specific example, continuous enrollment module 112 selects image 5 (shown by the red border). Continuous enrollment module 112 then adds image 5 to the face template, thereby allowing computing device 104 to verify the user's identity on a subsequent authentication attempt based on the facial pose shown in image 5 (rather than having to wait for the user to fully turn his face towards the camera as in image 12).

Figure 4:
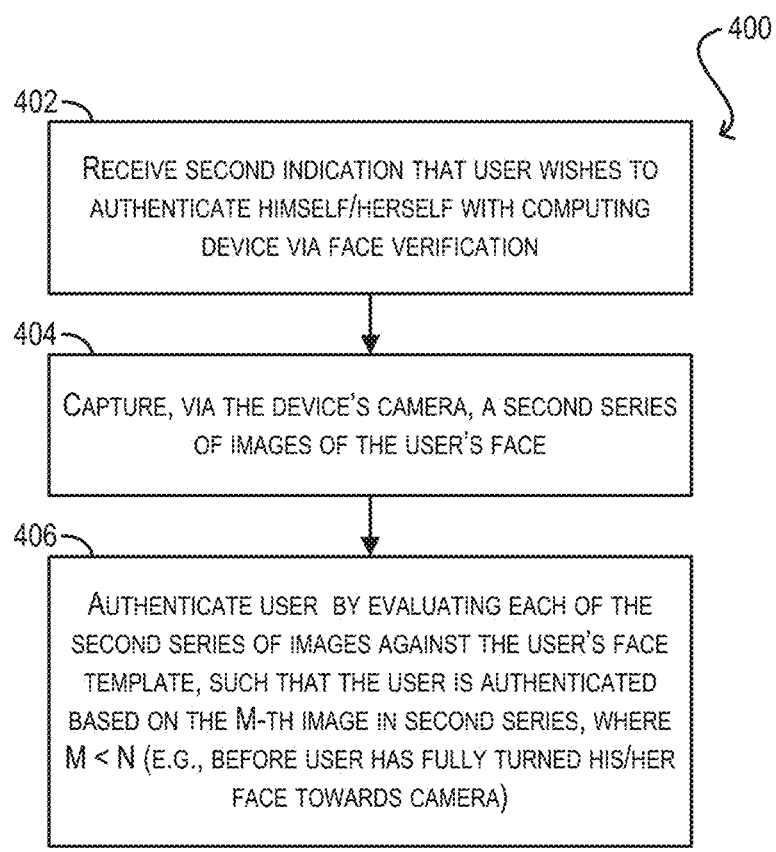
FIG. 4 depicts a second workflow for enabling continuous enrollment for face verification according to an embodiment.

FIG. 4 depicts a workflow 400 that can be performed by computing device 104 for authenticating user 102 on a second authentication attempt (i.e., after the user's face template has been updated per workflow 200 of FIG. 2) according to an embodiment. Starting with block 402, computing device 104 can receive a second indication that user 102 wishes to authenticate himself or herself with the device via face verification.

At block 404, computing device 104 can capture, via camera 108, a second series of images of user 102's face. This processing can be similar to block 204 of FIG. 2.

Then, at block 406, face verification module 108 can evaluate each of the second series of images captured at block 404 against the face template for user 102 and can authenticate the user based on the M-th image in the series, where M is less than N. For instance, image M may be an image of user 102's face before he/she has fully turned to look at camera 108 (e.g., image 5 in FIG. 3). This is made possible by the fact that user 102's face template has been updated (per block 210 of FIG. 2) to include data for this off-pose position. The end result of this processing is that user 102 is authenticated at a significantly earlier point in time when compared to the first authentication attempt of FIG. 2.

4. Exemplary Computing Device

Figure 5:
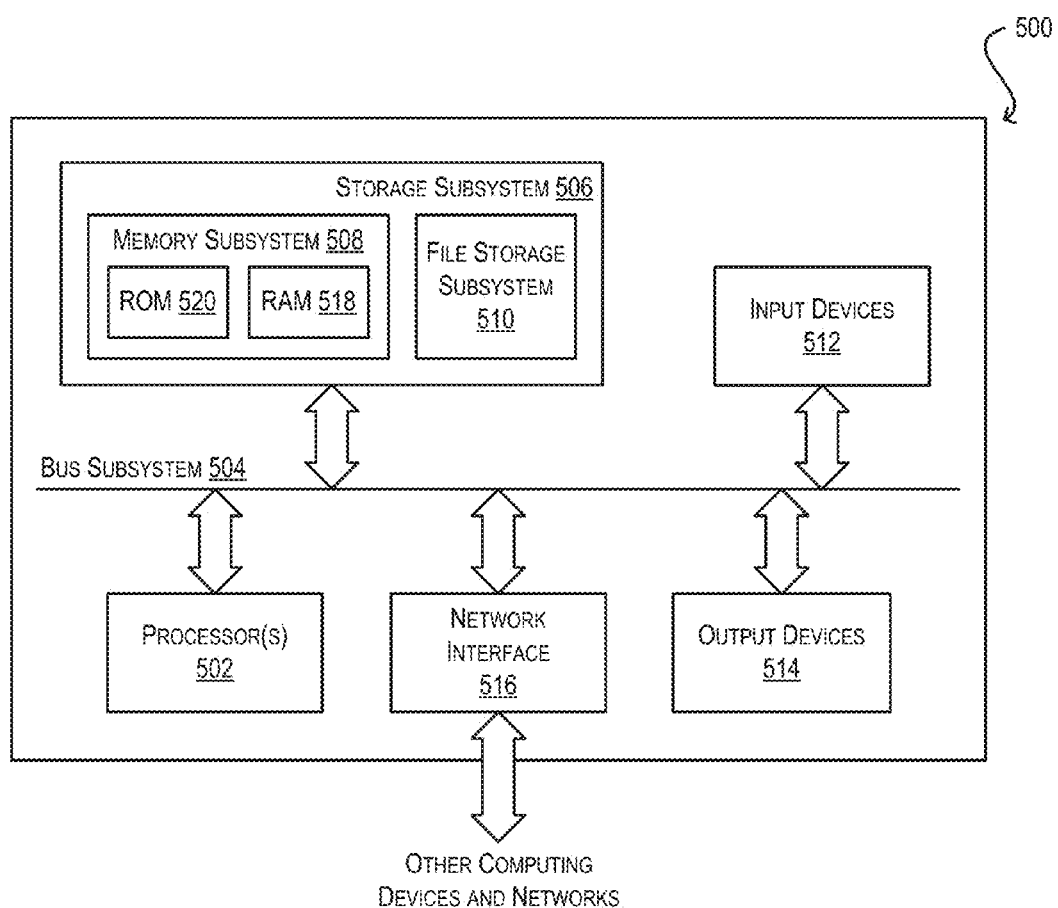
FIG. 5 depicts a computing device according to an embodiment.

FIG. 5 is a simplified block diagram of a computing device 500 that may be used to implement the foregoing embodiments of the present invention. As shown, computing device 500 includes one or more processors 502 that communicate with a number of peripheral devices via a bus subsystem 504. These peripheral devices include a storage subsystem 506 (comprising a memory subsystem 508 and a file storage subsystem 510), input devices 512, output devices 514, and a network interface subsystem 516.

Bus subsystem 504 can provide a mechanism for letting the various components and subsystems of computing device 500 communicate with each other as intended. Although bus subsystem 504 is shown schematically as a single bus, alternative embodiments of the bus subsystem can utilize multiple buses.

Network interface subsystem 516 can serve as an interface for communicating data between computing device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

Input devices 512 can include a camera (such as camera 108 of FIG. 1), a touch-screen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 500.

Output devices 514 can include a display subsystem (e.g., a flat-panel display), an audio output device (e.g., a speaker), and/or the like. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 500 is illustrative and not intended to limit embodiments of the present invention. Many other configurations having more or fewer components than computing device 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    receiving, by a computing device from a user, a first indication that the user wishes to authenticate himself or herself with the computing device via face verification;
    in response to the first indication, capturing, by the computing device using a camera, a first series of images of the user's face;
    authenticating, by the computing device, the user by evaluating each of the first series of images against a face template for the user, wherein the user is authenticated based on an N-th image in the first series;
selecting, by the computing device, one or more images from the first series prior to the N-th image;
adding, by the computing device, the one or more images to the face template for the user;
at a later point in time, receiving, by the computing device from the user, a second indication that the user wishes to authenticate himself or herself with the computing device via face verification;
in response to the second indication, capturing, by the computing device using the camera, a second series of images of the user's face; and
authenticating, by the computing device, the user by evaluating each of the second series of images against the face template for the user, wherein the user is authenticated based on an M-th image in the second series, and wherein M is less than N.

2. The method of claim 1 wherein the face template is based on one or more enrolled images of the user's face, and wherein the one or more enrolled images solely comprise a frontal view of the user's face.

3. The method of claim 1 wherein, in the one or more images selected from the first series, the user's face is turned away from the camera.

4. The method of claim 1 wherein the computing device buffers the first series of images as part of the capturing.

5. The method of claim 1 wherein the user's face is turned away from the camera in the M-th image.

6. The method of claim 1 wherein the user is authenticated based on the M-th image because the user's facial pose in the M-th image matches one of the one or more images selected from the first series.

7. The method of claim 1 wherein selecting the one or more images comprises selecting the first image in the first series.

8. The method of claim 1 wherein selecting the one or more images comprises selecting the N-1 images in the first series prior to the N-th image.

9. The method of claim 1 wherein selecting the one or more images comprises:
calculating a measure of similarity between each of the first series of images and the face template; and
selecting the one or more images based on the measures of similarity.

10. The method of claim 1 wherein the user is situated within a vehicle, and wherein the computing device is a mobile device that is placed in a stationary position, relative to the user, in the vehicle.

11. A non-transitory computer readable medium having stored thereon program code executable by a processor of a computing device, the program code comprising:
code that causes the processor to receive, from a user, a first indication that the user wishes to authenticate himself or herself with the computing device via face verification;
in response to the first indication, code that causes the processor to capture, using a camera of the computing device, a first series of images of the user's face;
code that causes the processor to authenticate the user by evaluating each of the first series of images against a face template for the user, wherein the user is authenticated based on an N-th image in the first series;
code that causes the processor to select one or more images from the first series prior to the N-th image;
code that causes the processor to add the one or more images to the face template for the user;
code that causes the processor to receive, from the user at a later point in time, a second indication that the user wishes to authenticate himself or herself with the computing device via face verification;
code that causes the processor to capture, using the camera, a second series of images of the user's face in response to the second indication; and
code that causes the processor to authenticate the user by evaluating each of the second series of images against the face template for the user, wherein the user is authenticated based on an M-th image in the second series, and wherein M is less than N.

12. The non-transitory computer readable medium of claim 11 wherein the face template is based on one or more enrolled images of the user's face, and wherein the one or more enrolled images solely comprise a frontal view of the user's face.

13. The non-transitory computer readable medium of claim 11 wherein, in the one or more images selected from the first series, the user's face is turned away from the camera.

14. The non-transitory computer readable medium of claim 11 wherein the processor buffers the first series of images in an associated memory as part of the capturing.

15. The non-transitory computer readable medium of claim 11 wherein the user's face is turned away from the camera in the M-th image.

16. The non-transitory computer readable medium of claim 11 wherein the user is authenticated based on the M-th image because the user's facial pose in the M-th image matches one of the one or more images selected from the first series.

17. The non-transitory computer readable medium of claim 11 wherein the code that causes the processor to select the one or more images comprises code that causes the processor to select the first image in the first series.

18. The non-transitory computer readable medium of claim 11 wherein the code that causes the processor to select the one or more images comprises code that causes the processor to select the N−1 images in the first series prior to the N-th image.

19. The non-transitory computer readable medium of claim 11 wherein the code that causes the processor to select the one or more images comprises:
code that causes the processor to calculate a measure of similarity between each of the first series of images and the face template; and
code that causes the processor to select the one or more images based on the measures of similarity.

20. The non-transitory computer readable medium of claim 11 wherein the user is situated within a vehicle, and wherein the computing device is a mobile device that is placed in a stationary position, relative to the user, in the vehicle.

21. A computing device comprising:
a memory;
a camera;
a processor; and
a non-transitory computer readable medium having stored thereon program code which, when executed by the processor, causes the processor to:
receive, from a user, a first indication that the user wishes to authenticate himself or herself with the computing device via face verification;
in response to the first indication, capture, using the camera, a first series of images of the user's face;

authenticate the user by evaluating each of the first series of images against a face template for the user, wherein the user is authenticated based on an N-th image in the first series;

select one or more images from the first series prior to the N-th image;

add the one or more images to the face template for the user;

receive, from the user at a later point in time, a second indication that the user wishes to authenticate himself or herself with the computing device via face verification;

in response to the second indication, capture, using the camera, a second series of images of the user's face; and authenticate the user by evaluating each of the second series of images against the face template for the user, wherein the user is authenticated based on an M-th image in the second series, and wherein M is less than N.

22. The computing device of claim 21 wherein the face template is based on one or more enrolled images of the user's face, and wherein the one or more enrolled images solely comprise a frontal view of the user's face.

23. The computing device of claim 21 wherein, in the one or more images selected from the first series, the user's face is turned away from the camera.

24. The computing device of claim 21 wherein the processor buffers the first series of images in the memory as part of the capturing.

25. The computing device of claim 21 wherein the user's face is turned away from the camera in the M-th image.

26. The computing device of claim 21 wherein the user is authenticated based on the M-th image because the user's facial pose in the M-th image matches one of the one or more images selected from the first series.

27. The computing device of claim 21 wherein the program code that causes the processor to select the one or more images causes the processor to select the first image in the first series.

28. The computing device of claim 21 wherein the program code that causes the processor to select the one or more images causes the processor to select the N-1 images in the first series prior to the N-th image.

29. The computing device of claim 21 wherein the program code that causes the processor to select the one or more images causes the processor to:

calculate a measure of similarity between each of the first series of images and the face template; and select the one or more images based on the measures of similarity.

30. The computing device of claim 21 wherein the user is situated within a vehicle, and wherein the computing device is a mobile device that is placed in a stationary position, relative to the user, in the vehicle.

31. A method comprising:

receiving, by a computing device from a user, a first indication that the user wishes to authenticate himself or herself with the computing device via face verification;

in response to the first indication, capturing, by the computing device using a camera, a first series of images of the user's face;

authenticating, by the computing device, the user by evaluating each of the first series of images against a face template for the user, wherein the user is authenticated based on an N-th image in the first series;

selecting, by the computing device, one or more images from the first series prior to the N-th image, the selecting comprising:

calculating a measure of similarity between each of the first series of images and the face template; and selecting the one or more images based on the measures of similarity; and adding, by the computing device, the one or more images to the face template for the user.

32. A non-transitory computer readable medium having stored thereon program code executable by a processor of a computing device, the program code comprising:

code that causes the processor to receive, from a user, a first indication that the user wishes to authenticate himself or herself with the computing device via face verification;

in response to the first indication, code that causes the processor to capture, using a camera of the computing device, a first series of images of the user's face;

code that causes the processor to authenticate the user by evaluating each of the first series of images against a face template for the user, wherein the user is authenticated based on an N-th image in the first series;

code that causes the processor to select one or more images from the first series prior to the N-th image by:

calculating a measure of similarity between each of the first series of images and the face template; and selecting the one or more images based on the measures of similarity; and code that causes the processor to add the one or more images to the face template for the user.

33. A computing device comprising:

a memory;

a camera;

a processor; and a non-transitory computer readable medium having stored thereon program code which, when executed by the processor, causes the processor to:

receive, from a user, a first indication that the user wishes to authenticate himself or herself with the computing device via face verification;

in response to the first indication, capture, using the camera, a first series of images of the user's face;

authenticate the user by evaluating each of the first series of images against a face template for the user, wherein the user is authenticated based on an N-th image in the first series;

select one or more images from the first series prior to the N-th image by:

calculating a measure of similarity between each of the first series of images and the face template; and selecting the one or more images based on the measures of similarity; and add the one or more images to the face template for the user.

* * * * *